United States Patent
Vincent

(10) Patent No.: US 6,607,433 B2
(45) Date of Patent: Aug. 19, 2003

(54) DEVICE FOR MIXING AN AIR STREAM AND APPARATUS FOR HEATING AND/OR AIR-CONDITIONING THE CABIN OF A MOTOR VEHICLE COMPRISING THIS DEVICE

(75) Inventor: Philippe Vincent, Epernon (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 10/215,089

(22) Filed: Aug. 9, 2002

(65) Prior Publication Data
US 2003/0045224 A1 Mar. 6, 2003

(30) Foreign Application Priority Data
Aug. 30, 2001 (FR) .............................. 01 11271

(51) Int. Cl.$^7$ .................................................. B60H 1/00
(52) U.S. Cl. ........................... 454/143; 454/69; 454/159
(58) Field of Search ........................ 454/69, 156, 143, 454/906

(56) References Cited

U.S. PATENT DOCUMENTS 5,881,558 A 3/1999 Kawahara et al.
5,950,711 A 9/1999 Bendell
6,439,296 B1 * 8/2002 Arold et al. .................. 165/42

FOREIGN PATENT DOCUMENTS

EP 0 958 951 A1 11/1999

* cited by examiner

Primary Examiner—Derek Boles
(74) Attorney, Agent, or Firm—Liniak, Berenato & White

(57) ABSTRACT

The mixing device, for distributing in variable proportions a main air stream (8) flowing through an apparatus for heating and/or air-conditioning the cabin of a motor vehicle between a hot air duct (14) and a cold air duct (18), comprises a perforated panel (40) arranged in the hot duct (14) and a shut-off plate (44) that can move between an open position in which it is spaced away from the perforations (42) in the panel (40) and a shut-off position in which it shuts off the panel, a shutter (50) for adjusting the passage cross section of the cold air duct (18) that can move between an open position and a shut-off position, a control mechanism (54) for controlling, in synchronism, the movement of the shut-off plate (44) and the movement of the shutter (50).

33 Claims, 13 Drawing Sheets

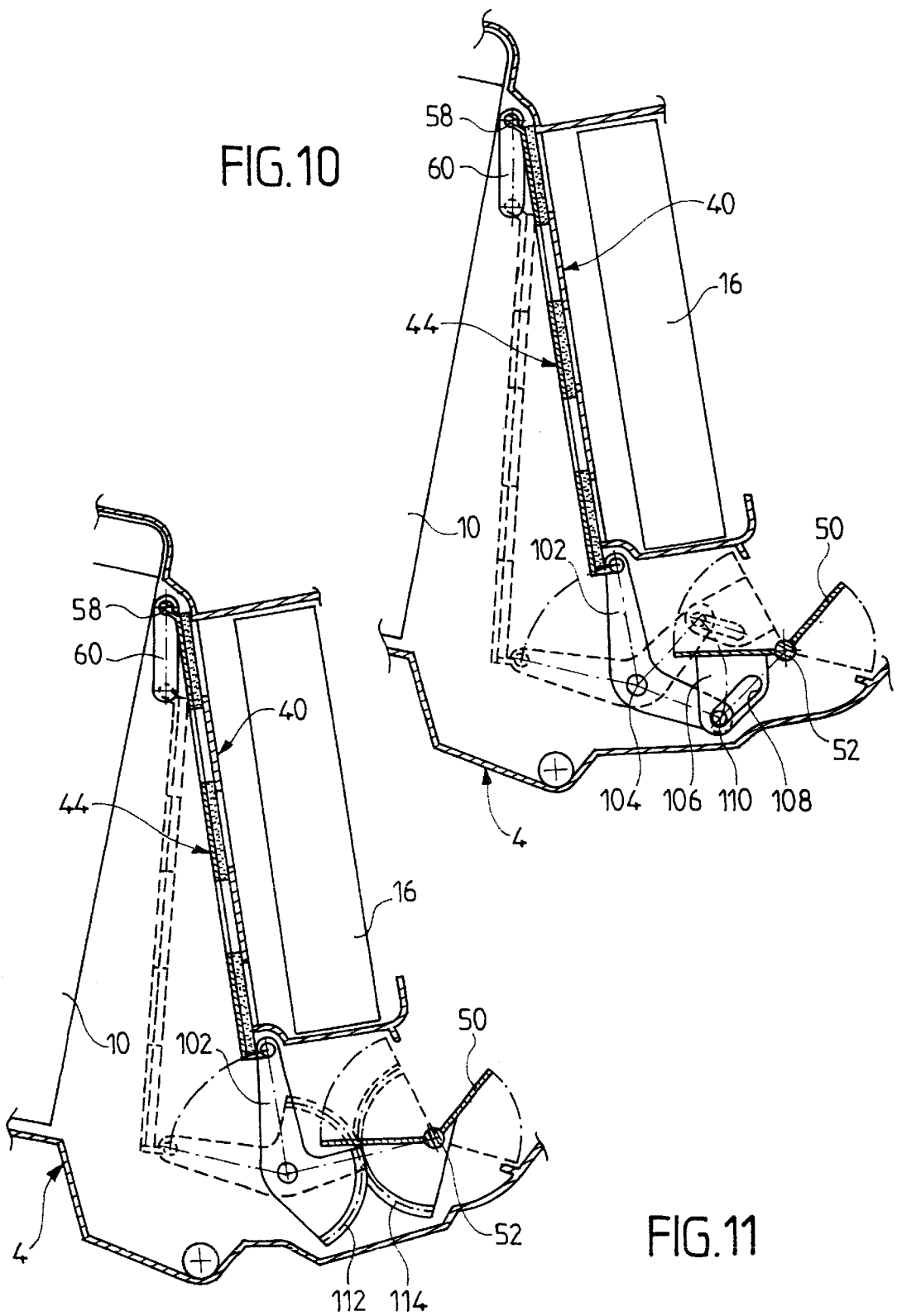

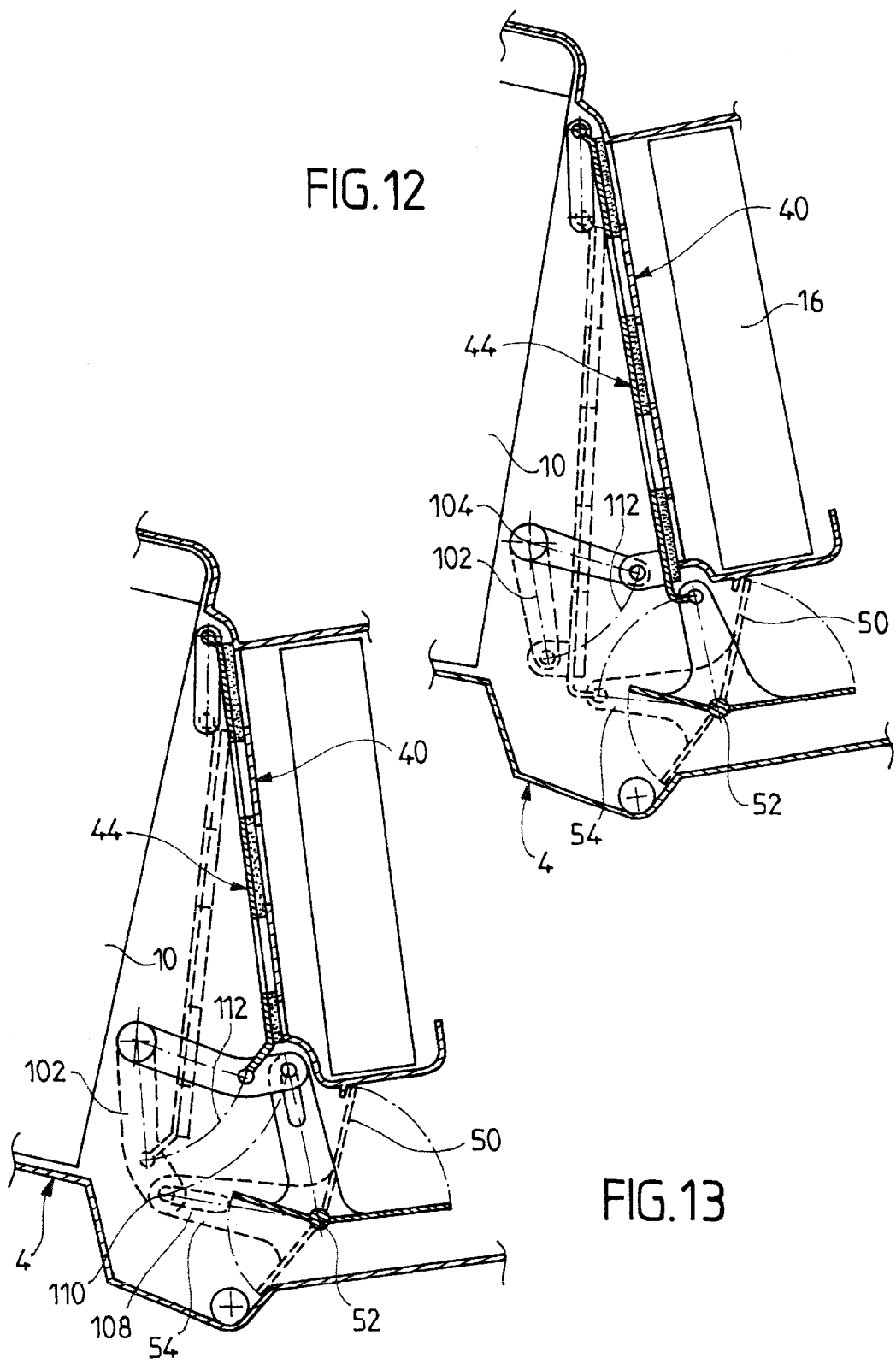

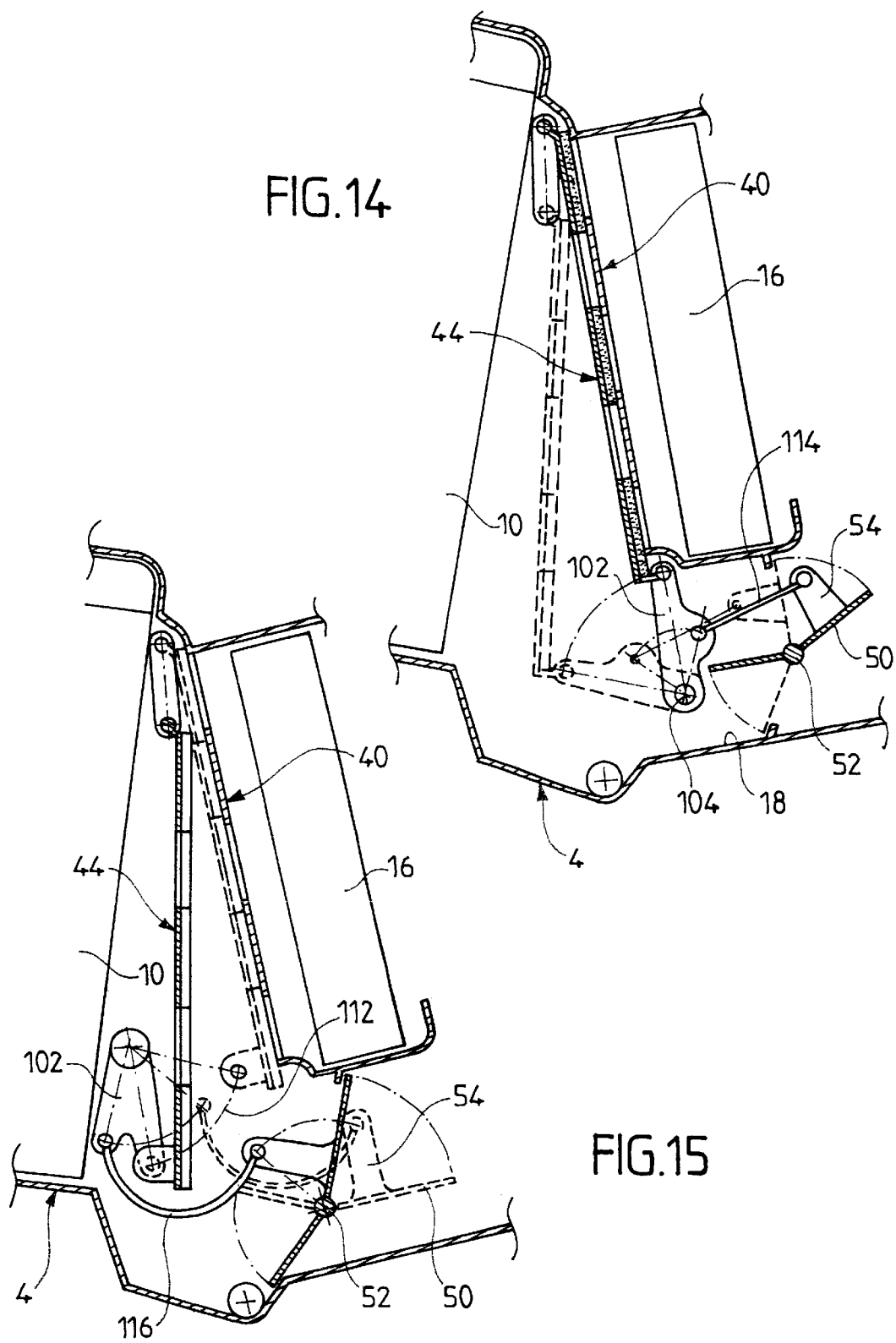

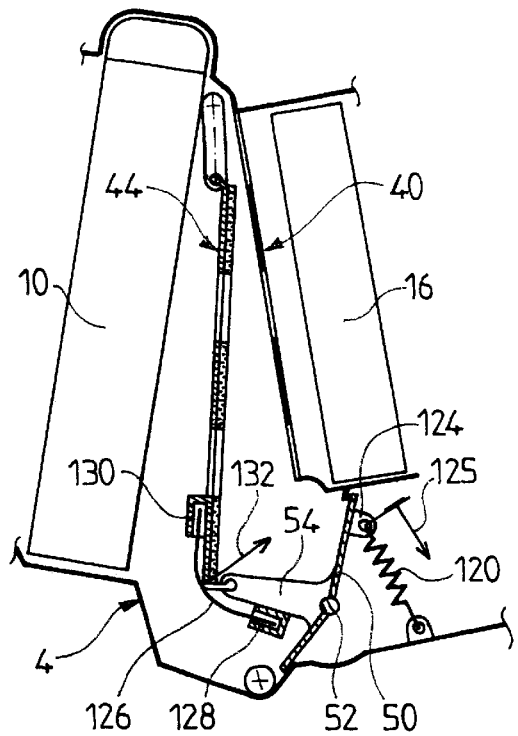 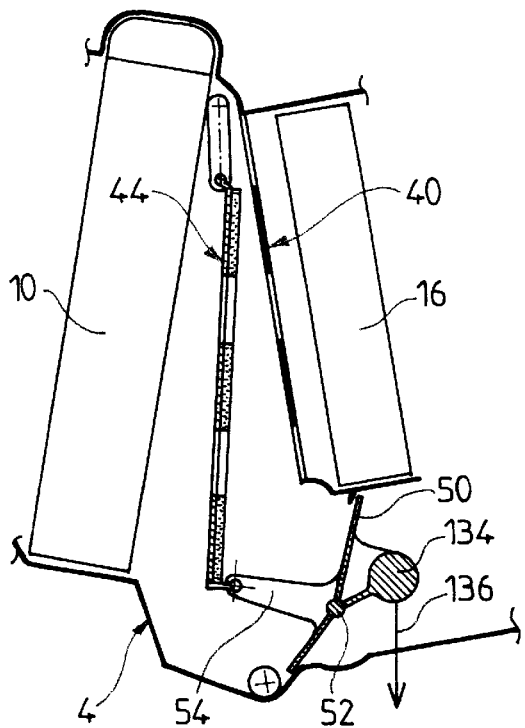
FIG.16 FIG.17
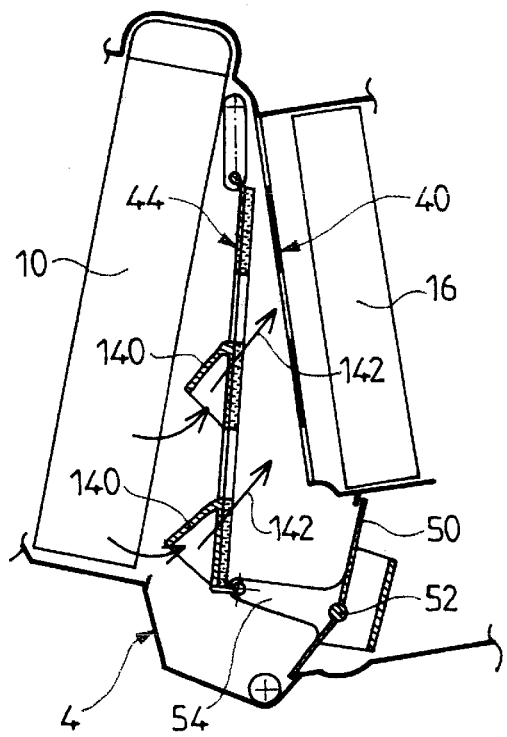
FIG.18

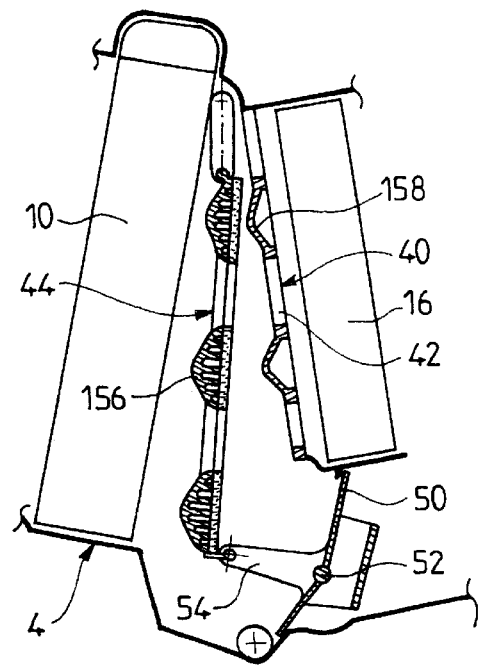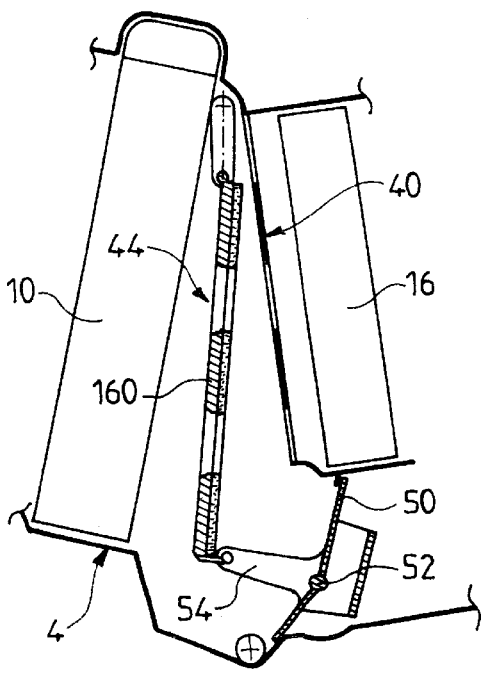
FIG. 23　　　　FIG. 24
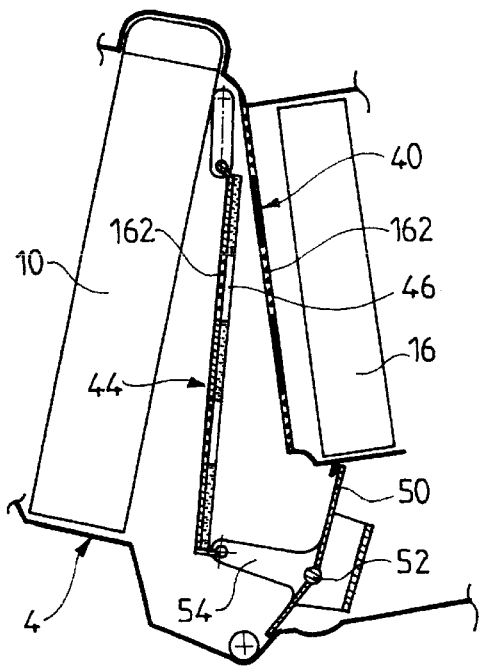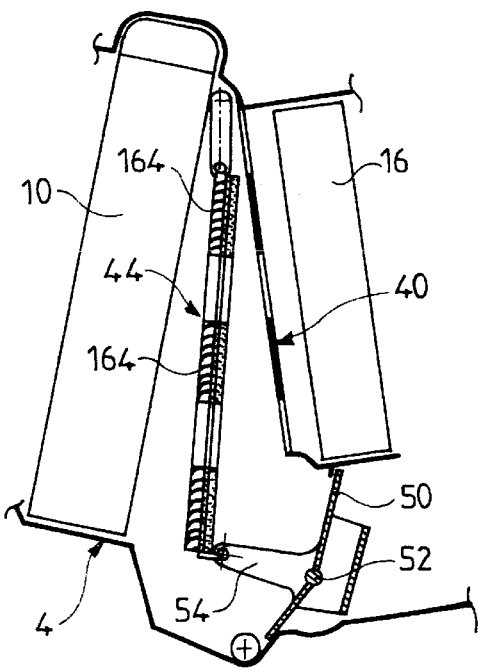
FIG. 25　　　　FIG. 26

DEVICE FOR MIXING AN AIR STREAM AND APPARATUS FOR HEATING AND/OR AIR-CONDITIONING THE CABIN OF A MOTOR VEHICLE COMPRISING THIS DEVICE

The invention relates to devices for heating and/or air-conditioning the cabin of a motor vehicle.

More specifically, it relates to a mixing device for distributing, in variable proportions, a main air stream, particularly a stream of air flowing through an apparatus for heating and/or air-conditioning the cabin of a motor vehicle, between at least one hot air duct and at least one cold air duct.

It also relates to an apparatus for heating and/or air-conditioning particularly the cabin of a motor vehicle, comprising a casing delimiting a passage through which an air stream flows, this passage splitting into at least one hot air duct and at least one cold air duct.

Apparatuses for heating the cabin of a motor vehicle generally comprise a casing housing a blower for blowing an air stream through the casing and then distributing it into the cabin. A heater matrix, mounted as a bypass in a heating-air duct, allows the air to be heated before it is introduced into the cabin when the outside temperature is low, for example in the winter.

In order to allow the user to set the air temperature to suit him, the ventilation and heating apparatus is equipped with a device for mixing the air which allows the air stream to be distributed in variable proportions between the hot air duct and the cold air duct. The mixing device also allows the ventilation and heating apparatus to be operated in a "hot" mode in which the cold air duct is entirely shut off so that all of the air passes through the heater matrix, and in a "cold" mode in which the hot air duct is entirely shut off so that all of the air avoids the heater matrix. The mixing devices, in order to operate satisfactorily, need to meet a certain number of requirements.

First of all, the device needs to guarantee perfect sealing of the hot air and cold air ducts. In the cold mode, this involves avoiding drawing in hot air which would have the effect of heating up the air introduced into the cabin of the vehicle. In the hot mode, it involves avoiding drawing in any cold air so as to make best use of the heating capability of the matrix.

The device has to allow flexibility in the aerothermal optimization of the heating apparatus. What happens is that this apparatus has several outlets, particularly a deicing outlet, an outlet level with the dashboard and an outlet level with the feet of the driver and of the front-seat passenger. In better-equipped vehicles, it also comprises an outlet for the rear seats. The mixing device needs to be able to duct and to direct the air stream toward preferred points so as to distribute it correctly among the various outlets. It has also to allow the relative amount of hot air and of cold air to be adjusted precisely and to allow the hot and cold air streams to be mixed correctly.

Furthermore, the apparatus has to be as compact as possible in order to reduce its bulk. This is why there have been proposed (EP 0 958 951) mixing devices which use a shut-off plate arranged roughly at right angles to the air stream and sliding in slideways of the casing. Although it has the advantage of being compact, this device does have numerous disadvantages.

Sealing is afforded by a seal. The squashing of this seal generates a high friction force upon sliding of the plate in the slideway. This friction force entails a very high control force.

The use of a single shut-off element does not allow the amount of hot air and cold air to be adjusted in order to meet the required temperature conditions for intermediate positions of the control. Furthermore, given that the shut-off plate is in one piece, the regions of the matrix which lie behind it are not crossed by the air stream. This arrangement does not encourage good mixing of the air and aerothermal optimization of the heating apparatus.

The need to seal the device dictates the use of tight tolerances on the components and fits. These tolerances are difficult to achieve with the methods and materials generally used for producing heating and air-conditioning apparatuses. The cost of manufacture is therefore increased.

The subject of the present invention is a mixing device which solves these disadvantages. These objectives are achieved, according to the invention, through the fact that the mixing device comprises at least one panel comprising a perforation arranged in the hot air duct and a shut-off plate that can move between an open position in which it does not cover the perforation in the panel and a shut-off position in which it shuts off the perforation in the panel; at least one shutter for adjusting the passage cross section of the cold air duct that can move between an open position and a shut-off position, and a control mechanism for controlling, in synchronism, the movement of the shut-off plate and the movement of the shutter for adjusting the passage cross section of the cold air duct between their open position and their shut-off position.

These movements are synchronized in such a way that the passage cross section of the hot air duct increases when the passage cross section of the cold air duct decreases, and vice versa. Furthermore, the hot air duct is completely open when the cold air duct is completely closed, and vice versa.

Thus, the device comprises two independent adjusting elements, one for the hot air duct and the other for the cold air duct. The design of these elements and the logic dictating their movement make it possible for all the characteristics of the air mixing function to be satisfied in an optimum manner. It guarantees flexibility of adjustment of the quantity and of the localization of the air stream to be injected into the hot air duct and into the cold air duct. It makes it possible to produce highly permeable hot air and cold air circuits, that is to say circuits in which the pressure drop is low. The air stream from the blower, or from the evaporator if the heating apparatus has one, passes directly through the matrix without undergoing any significant change in direction.

This device guarantees perfect sealing of the cold air circuit. The latter is indeed shut off by a specific closure shutter, which can be adjusted independently of that of the hot air circuit. The movement of this shutter is preferably a rotational movement which, at the end of travel, generates a closure force in the direction of the shutter bearing surfaces.

As a preference, the panel comprises a number of perforations and the shut-off plate has a number of cutouts, the perforations in the panel and the cutouts in the shut-off plate being arranged with respect to one another in such a way that the hot air duct is shut off when the shut-off plate is in its shut-off position.

By virtue of this preferred feature, the air let into the hot air duct is distributed over the entire frontal surface of the matrix whereas, in the prior art mentioned earlier, there are regions of the matrix which the air stream does not reach.

Furthermore, the number, location, direction, shape and dimensions of the perforations in the panel and of the cutouts in the shut-off plate constitute parameters that can be altered in order to aerothermally optimize the apparatus. Furthermore, this arrangement allows the shut-off plate a small-amplitude excursion, less than half the height of the matrix. This small-amplitude excursion makes it easier for the mixing device to be incorporated into the low-volume apparatuses. It also makes it possible to observe a significant distance between the bottom of the shut-off plate and the end of the casing. This arrangement has the advantage of generating a large working volume for creating a tray for collecting condensate from the evaporator, to make it easier for this condensate to flow toward a discharge orifice and avoid placing the shut-off plate sealing system in contact with the condensate. This then gets around the problems of smell which may result from the presence of this condensate. There is an air passage possibility allowing good supply to the hot air and cold air circuits.

Also as a preference, the shut-off plate moves in a combined movement of translation and of rotation.

By virtue of this feature, the shut-off plate of the hot air duct circuit is sealed by bearing against a bearing surface. This bearing effect is generated by the rotational movement of the control member which, at the end of travel, transmits a closure force roughly in the direction of the bearing effect to be achieved. This mode of operation is opposed to the one in the device described previously which uses a sliding movement generating a force roughly parallel to the bearing effect and therefore not suited to guaranteeing a good seal.

Furthermore, the force to be employed in order to guarantee perfect sealing of the shut-off plate is not applied until the end of travel. It does not therefore affect the movement of the elements, which can move freely without significant force, during the most part of their movement.

Furthermore, the air pressure plays a part in pressing the shut-off plate against its bearing surface and encouraging sealing.

The position of the center and the length of the radius, and the angles subtended by the shut-off plate drive sector are parameters which further increase the flexibility in the aerothermal optimization of the mixing device. For example, a different position of the drive sector with respect to the shut-off plate may, for a given position of the temperature control, increase or decrease the amount of air injected into the lower part of the matrix.

Keeping the lateral faces of the panel away from the lateral edges of the shut-off plate may allow more air to be let in in addition to the air passing through the openings of the shut-off plate. This additional air stream may play a part in distributing the air even more uniformly over the entire frontal area of the matrix. This arrangement guarantees an optimum thermal matching coefficient.

Because the mixing device uses mainly transmissions of rotary movement, the contacts and friction between the parts are limited. That makes it possible to limit the control forces, the movement noises and the vibration of the parts, and the wear thereon. The reliability of the system is guaranteed by the possibility, when manufacturing the components, of keeping to low fit and movement tolerances.

Additional or optional features of the invention are listed below.

The heater matrix is roughly vertical; and then:
 the device comprises a single cold air duct situated below the hot air duct;
 the device comprises a single cold air duct situated above the hot air duct;
 the device comprises a cold air duct situated below the hot air duct and a cold air duct situated above the hot air duct;
 the device comprises a single cold air duct situated to the side of the hot air duct;
 the device comprises two cold air ducts situated one to each side of the hot air duct;
the heater matrix is roughly horizontal; and in this case:
 the device comprises a single cold air duct situated in front of the hot air duct;
 the device comprises a single cold air duct situated behind the hot air duct;
 the device comprises a cold air duct situated in front of the hot air duct and a cold air duct situated behind the hot air duct;
 the device comprises a single cold air duct situated to the side of the hot air duct;
 the device comprises two cold air ducts situated one to each side of the hot air duct;
the control mechanism comprises a control lever which controls the movement of the shut-off plate and the movement of the shutter for adjusting the passage cross section of the cold air duct;
the control lever controls the movement of the shut-off plate and/or the movement of the shutter for adjusting the passage cross section of the cold air duct via a link rod;
the control lever controls the movement of the shut-off plate and/or the movement of the shutter for adjusting the passage cross section of the cold air duct via a toothed sector;
the shut-off plate and/or the shutter for adjusting the passage cross section of the cold air duct are equipped with a balancing device;
the balancing device consists of a spring, a bob weight or scoops;
the shut-off plate and/or the shutter for adjusting the passage cross section of the cold air duct comprise air deflecting means such as bridging pieces or ribs to direct the hot air stream and/or the cold air stream toward chosen regions of a device for heating and/or air-conditioning the cabin of a motor vehicle;
the shut-off plate and/or the panel comprise sealing means for sealing the hot air duct when the shut-off plate is in the shut-off position;
the sealing means consist of flexible lips overmolded onto the panel and/or onto the shut-off plate;
the sealing means consist of a foam seal provided on the panel and/or on the shut-off plate;
the shut-off plate and/or the panel comprise means for attenuating the level of noise generated by their operation;
the means for attenuating the noise level consist of a profiling of the panel and/or of the shut-off plate;
the means for attenuating the noise level consist of inserts made of lightened material;
the means for attenuating the noise level consist of inserts covered with an insulating material;
the means for attenuating the noise level consist of a grating provided in the cutouts of the shut-off plate.

Furthermore, the invention relates to an apparatus for heating and/or air-conditioning particularly the cabin of a motor vehicle, and which comprises a mixing device according to the invention.

The device for mixing the air stream may be installed directly in the casing. Alternatively, the device for mixing the air stream may constitute an independent module attached into the casing.

Other feature and advantages of the present invention will become further apparent from reading the description which follows of some exemplary embodiments which are given by way of illustration with reference to the figures. In these figures:

FIGS. 10 to 15 illustrate various embodiments of the mechanism for controlling the movements of the shut-off plate and of the shutter for adjusting the passage cross section of the cold air duct;

FIGS. 16 to 18 illustrate three possible alternative forms of embodiment of a mixing device according to the invention comprising means of balancing the control forces exerted on the shut-off plate and/or on the shutter for adjusting the passage cross section of the cold air duct;

FIGS. 23 to 26 depict various arrangements making it possible to reduce the level of operating noise of the mixing device of the invention.

Figure 1:
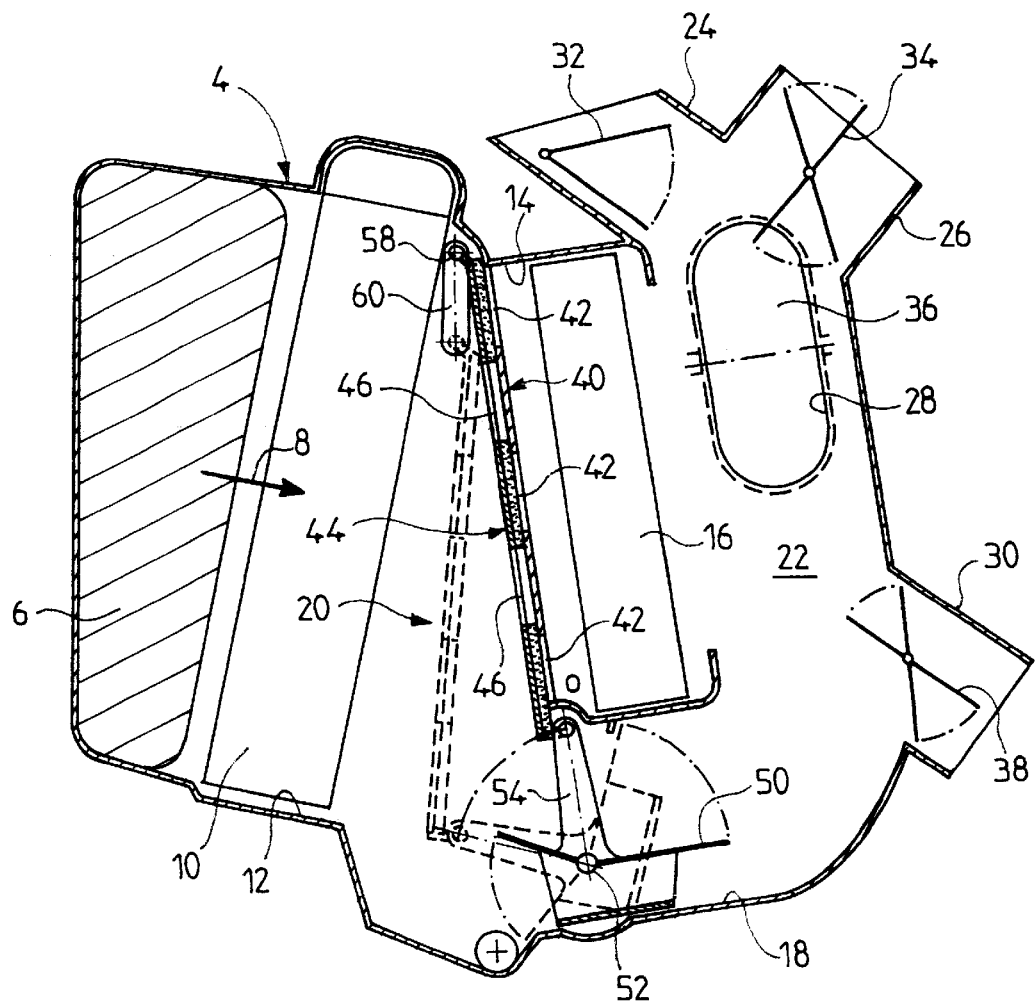
FIG. 1 is a sectional overall view of a heating and air-conditioning apparatus comprising a mixing device according to the present invention.

FIG. 1 depicts a sectional overall view of a heating, ventilating and air-conditioning apparatus according to the invention. It comprises a casing 4 in which there is formed an air inlet 6 for a main air stream depicted schematically by the arrow 8. An evaporator 10 is mounted in a main duct 12 formed in the casing 4. The main duct 12 then splits into a hot duct 14 in which a heater matrix 16 is mounted and a cold duct 18 which constitutes a bypass parallel to the hot duct 14. The heating apparatus can operate in hot mode, in cold mode or in intermediate mode. In hot mode, the cold air duct is shut off and all the air passes through the heater matrix 16. In cold mode it is, by contrast, the hot air duct which is shut off and the entire air stream passes through the cold air duct 18. In intermediate mode, the air stream 8 is split in adjustable proportions between the hot duct and the cold duct. The hot stream and the cold stream mix in a mixing chamber 22. The air is then directed to the points of use by means of trunking. In the example depicted, there is an outlet 24 for deicing/demisting the windshield, a dashboard ventilation outlet 26, an outlet 28 for heating the feet and finally an outlet 30 intended to convey air to the rear seats of the vehicle. Adjusting shutters, denoted respectively by the references 32, 34, 36 and 38, allow the users to adjust at will the amount of air flowing through each of these outlets. The functions of shutting off the hot duct 14 and the cold duct 18, and the function of distributing the air stream between these two ducts in an intermediate position are obtained by means of a device known in the text which follows as the air mixing device, and denoted by the general reference 20.

In the exemplary embodiment depicted, the mixing device 20 comprises a panel 40 mounted in a fixed position in the casing 4 and having perforations 42, three of these according to the figure. The mixing device also comprises a shut-off plate 44 comprising openings 46. The shut-off plate 44 can move between a shut-off position and an open position. In the shut-off position, depicted in solid line in the figure, the perforations in the panel 40 and the openings 46 in the shut-off plate do not overlap, which means that the superposition of the shut-off plate and of the panel entirely shuts off the hot duct 14. As will be detailed in greater detail later, sealing means are provided between the panel and the shut-off plate so as to seal off the duct 14.

In its open position, depicted in dotted line in the figure, the shut-off plate 14 is spaced, at least at one of its ends, away from the panel 40. Thus, the perforations in the panel and the openings in the plate do not overlap, and this allows air to pass.

The mixing device also comprises an element for shutting off the cold air duct 18. In the example depicted, this element consists of a shutter 50 mounted to rotate about a spindle 52. The shutter 50 is able to pivot between an open position, depicted in solid line in the figure, and a shut-off position depicted in dotted line, in which position the ends of the shutter 50 rest against bearing surfaces formed in the casing so as to seal off the cold duct 18. The rotational movement of the shutter 50 may be controlled from outside the casing, for example using the spindle 52 to which the shutter 50 is attached. The shutter 50 has an arm 54 directed roughly at right angles to its plane. The free end of the arm 54 is articulated to the lower end, according to FIG. 1, of the shut-off plate 44. At its upper end, the shut-off plate 44 has two pegs 58 which are each able to slide in a ramp 60 formed in the casing 4.

Thus, the movement of the shutter 50 is a simple rotation, while the movement of the shut-off plate 44 is a combined movement of rotation and of translation. These kinetics constitute an advantageous preferred feature of the invention. What happens is that during practically all of its translational movement the shut-off plate 44 is not in contact with the panel 40. The frictional resistance to be overcome is therefore very low because it is restricted to the sliding of the pegs 58 in the ramp 60 and to the pivoting movement of the lower end of the shut-off plate 44 about the free end of the arm 54. By contrast, at the end of the shut-off travel, the arm 54 of the lever 50 exerts a force on the shut-off plate, which force is roughly at right angles to the plane of the join between the panel 40 and the shut-off plate 44. This perpendicular force allows the seal to be squashed and thus provides a perfect seal against the air stream.

Figure 2:
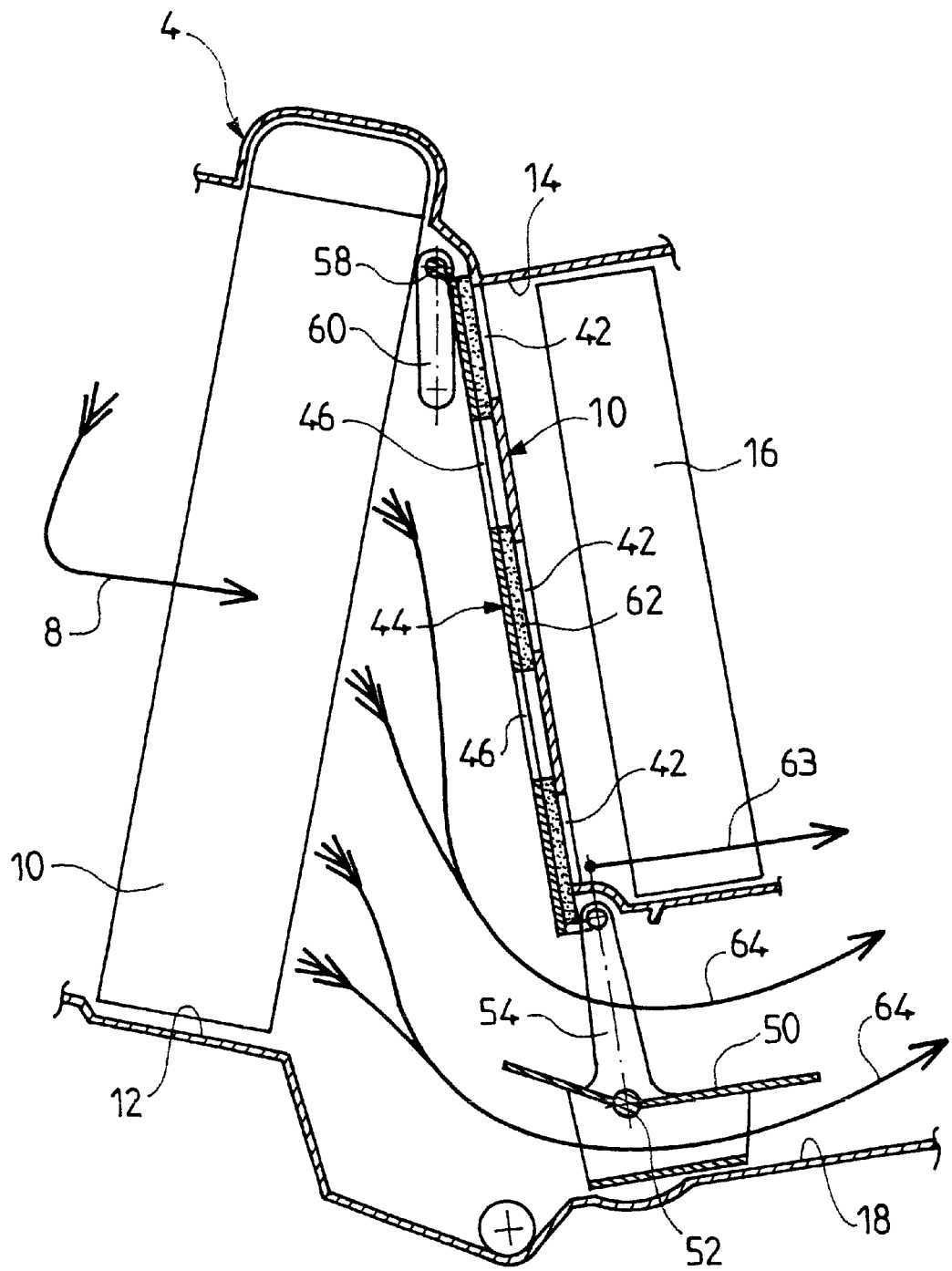
FIG. 2 is a sectional part view of the apparatus depicted in FIG. 1, operating in cold mode.

FIG. 2 depicts a part view of the heating, ventilating and air-conditioning apparatus depicted in FIG. 1 in cold mode. In this position, the hot air duct 14 is entirely shut off by the shut-off plate 44. As can be seen, the latter is covered with a seal, for example a foam seal 62, which presses in a sealed manner against the panel 40. The two pegs 58 are at the upper part of the ramps 60. The shape of the ramps is designed so that the upper end of the shut-off plate 44 is pressed against the panel 40 at the end of travel.

The lower end of the shut-off plate 44 is pressed against the panel 40 by the lever 54, the direction of the force being depicted by the arrow 63. By contrast, the hot duct 18 is entirely open, the faces of the shutter 50 being arranged roughly parallel to the air stream 64. As can be seen in this embodiment, the shutter 50 has air deflectors, for example a bridging piece 66, which allow aerothermal optimization of the heating apparatus. Examples of such deflectors will be described in greater detail later.

Figure 3:
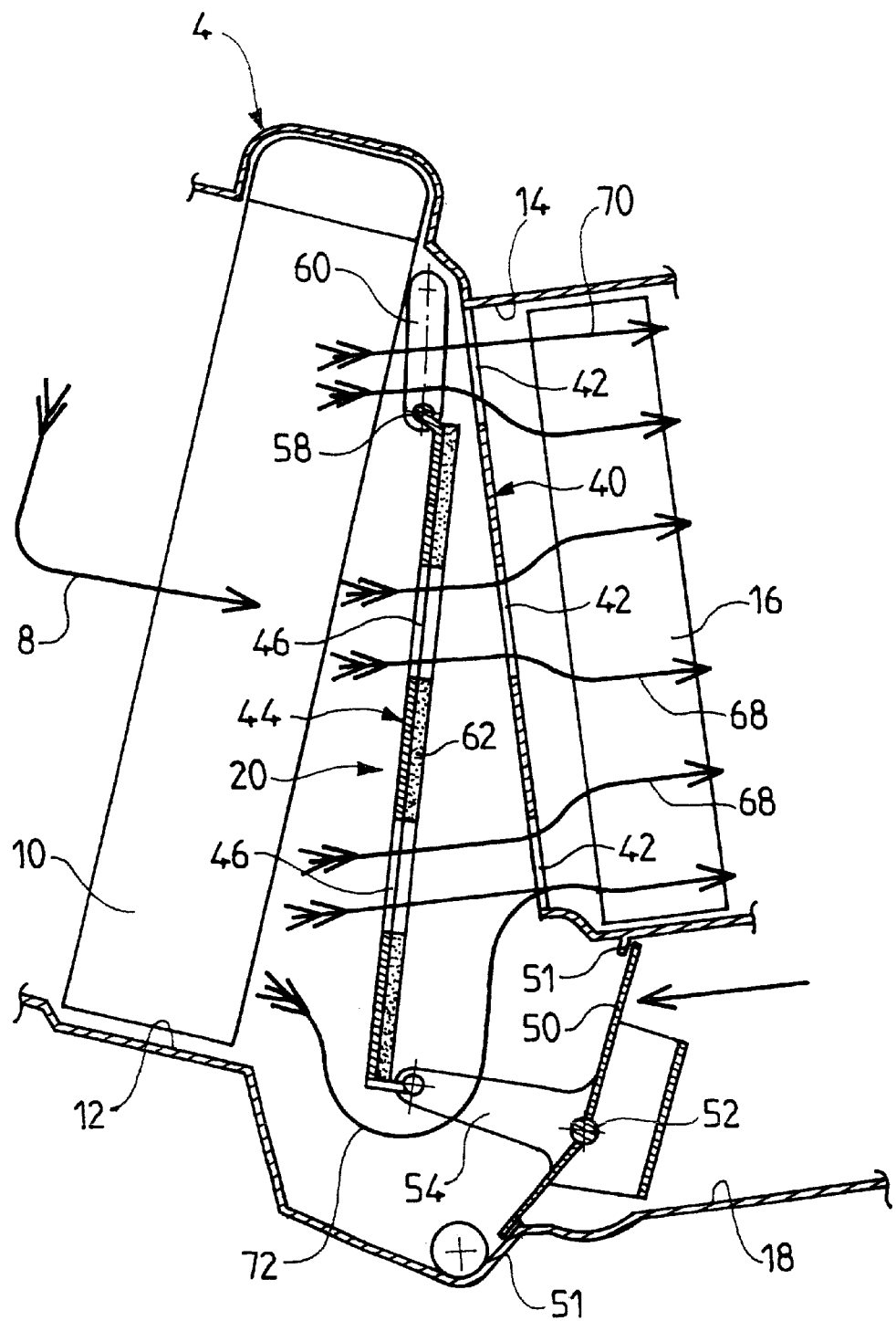
FIG. 3 is a view similar to FIG. 2, the apparatus operating in an intermediate position.

FIG. 3 depicts the mixing device 20 in hot mode. In this position, the cold air duct 18 is entirely shut off by the shutter 50, the ends of which are bearing against bearing surfaces 51 of the casing. It can be seen that the pegs 58 are situated at the lower end of the ramps 60 and that the perforations 42 in the panel 40 are situated facing the openings 46 in the shut-off plate 44. Thus, the passage cross section offered to the flow of air 68 passing through the openings 46 and the perforations 42 is a maximum. Other flows of air, denoted by the reference 70, do not pass through the shut-off plate 44 but pass over its upper end before passing through the upper perforation in the panel 40. Finally, flows of air, denoted by the reference 72, pass between the lower end of the shut-off plate 44 and the end of the casing 4. These air flows, ducted by the shutter 50 in the closed position, rise up toward the panel 40. This additional air stream plays a part in distributing the air even more uniformly over the entire frontal area of the matrix 16. This arrangement guarantees an optimum thermal matching coefficient.

Figure 4:
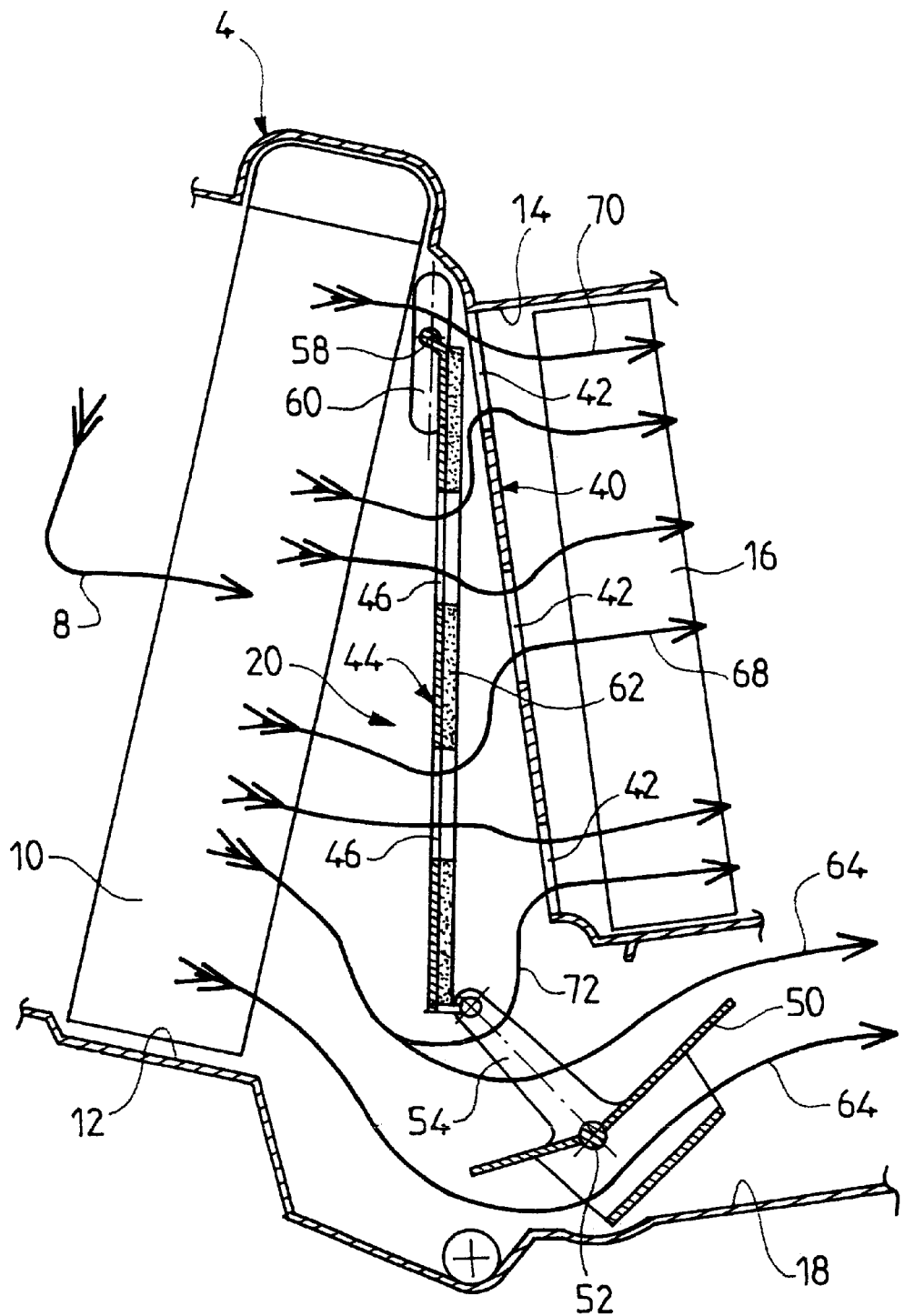
FIG. 4 is a view similar to FIGS. 2 and 3, the heating and air-conditioning apparatus operating in hot mode.

FIG. 4 depicts the mixing device 20 in an intermediate position. The shutter 50 is in an intermediate position somewhere between its wide open position depicted in FIG. 2 and its fully closed position depicted in FIG. 3. Likewise, the shut-off plate 44 is in an intermediate position somewhere between its closed position depicted in FIG. 2 and its wide open position depicted in FIG. 3. It can be seen that the pegs 58 are situated at an intermediate position somewhere between the extreme positions depicted in FIGS. 2 and 3. Under these conditions, the shut-off plate is spaced away from the panel 40, but by a distance shorter than that of its wide open position (FIG. 3). The flows of air 68 can pass through the openings 46 in the shut-off plate and the perforations 42 in the panel 40. However, there is a certain offset between the openings in the plate and the perforations in the panel which means that the path of the air flows 68 is not straight. An air stream 70 can also flow over the upper end of the shut-off plate 42, as described with reference to FIG. 3. However, the space available is more restricted. The air flow 72 which passes over the lower end of the shut-off plate 44 also constitutes an additional air stream which adds to the streams 68 and 72. Finally, the streams 64 constitute a cold stream which flows through the cold air duct 18 shut off only partially because of the intermediate position of the shutter 50. The hot air streams which have passed through the heater matrix 16 and the cold air streams 64 which have passed through the cold air duct 18 then mix in the mixing chamber 22 (FIG. 1) to give an air stream the temperature of which is an intermediate temperature somewhere between that of the hot stream and that of the cold stream.

Figure 5:
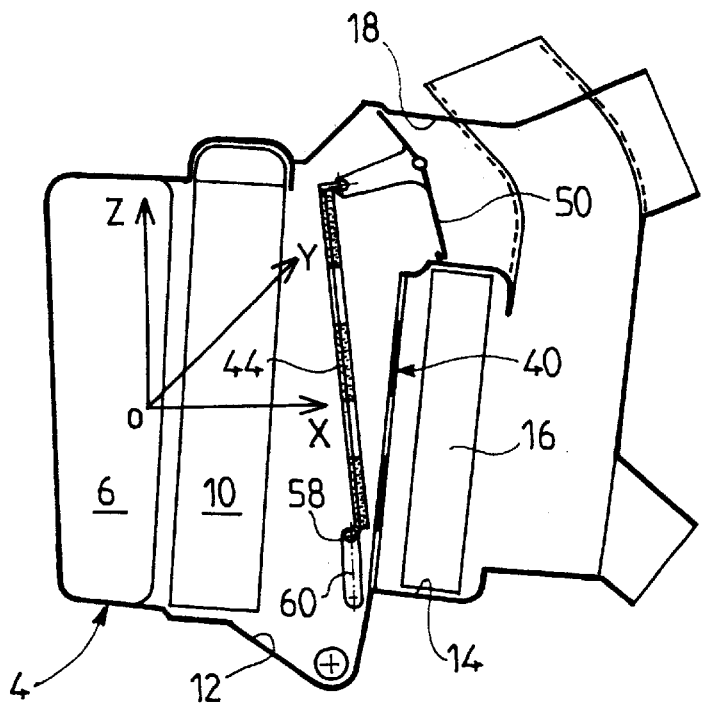
FIGS. 5 to 8 depict various possible architectures of a heating and/or air-conditioning apparatus comprising a mixing device according to the present invention.

The heating and air-conditioning apparatus depicted in FIGS. 1 to 4 has a single hot air duct and a single cold air duct. FIGS. 5 to 8 depict alternative forms of embodiment of this apparatus comprising several cold air ducts or a different arrangement of these ducts. In FIG. 5, the axis OX of the orthonomral frame of reference XYZ denotes the front-rear longitudinal direction of the vehicle, the axis OY denotes the lateral direction, and the axis OZ denotes the vertical direction. The cold air duct 18 is arranged above the heater matrix 16 and the hot air duct 14 is below the cold air duct 18. Apart from this difference, the way in which the mixing device works is the same as that described with reference to FIGS. 1 to 4.

Figure 6:
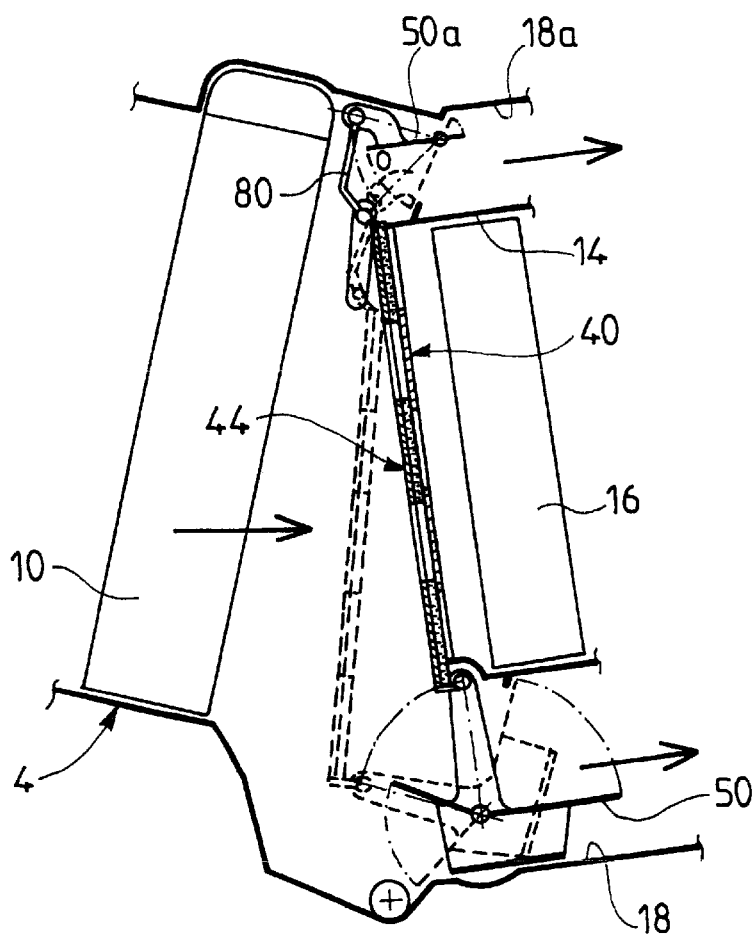

The mixing device depicted in FIG. 6 comprises a single hot air duct 14 but two cold air ducts. The cold air duct 18 is placed below the heater matrix 16, as in the embodiment of FIGS. 1 to 4. Furthermore, the device comprises a second cold air duct, denoted by the reference 18*a*, situated above the heater matrix. A pivoting shutter 50*a* is mounted in the duct 18*a*. This shutter is actuated via an arm 80 secured to the upper end of the shut-off plate 44. The movement of the shut-off plate thus controls the rotation of the shutter 50*a*. In that way, a single control causes three members to move simultaneously, and these are the shutter 50, the shut-off plate 44 and the shutter 50*a*. The additional cold air duct 18*a* can be used to bring in additional cold air so as to distribute a greater amount of cold air or to make it easier to control temperature differences or to distribute air to the various air outlet vents of the apparatus. In the latter case, arrangements on the shutter 50*a* or inside the duct 18*a* may be made to calibrate or direct the air stream precisely.

Figures 7, 8:
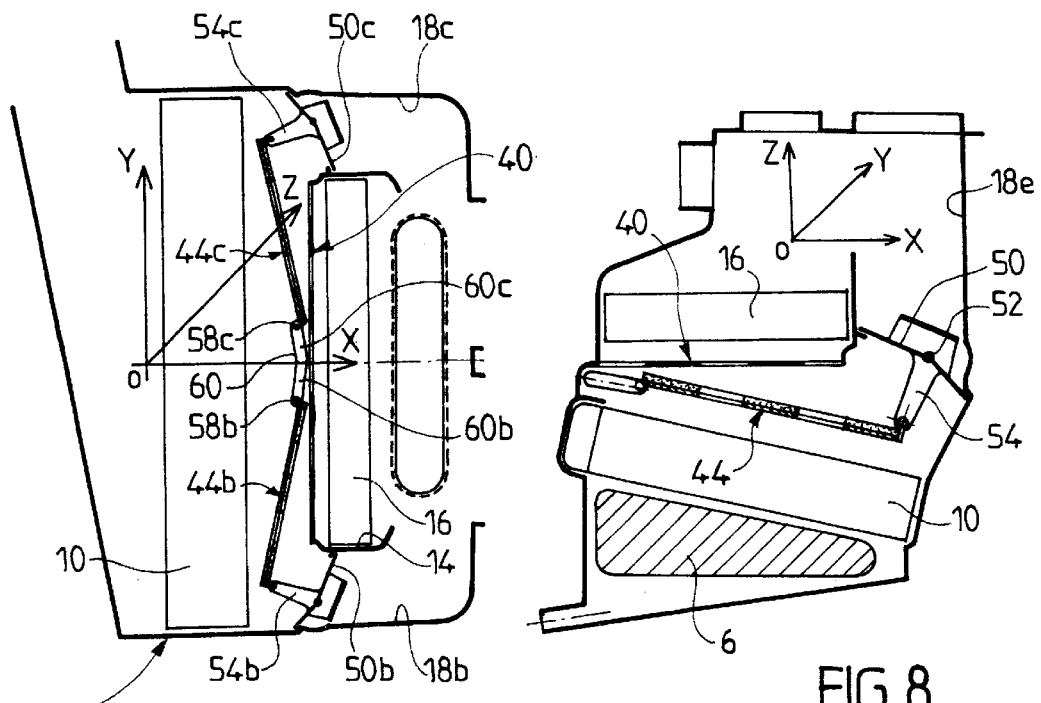

In FIG. 7, the heater matrix 16 is vertical, as in the embodiment described earlier. It comprises two cold ducts 18*b* and 18*c* arranged to the side of a single hot air duct 14. Pivoting shutters 50*b* and 50*c* are mounted in each of the passages 18*b* and 18*c*. Although the hot air duct 14 is a single one, the mixing device comprises two shut-off plates 44*b* and 44*c*. At one of their ends, the shut-off plates are articulated to arms 54*b* and 54*c* secured to the shutters 50*b* and 50*c*. At their other end, the shut-off plates have pegs 58*b* and 58*c* which slide in a ramp 60 consisting of two parts 60*b* and 60*c*. In this embodiment, a single control causes four members to move simultaneously.

Whereas, in the previous embodiments, the heater matrix 16 is in the vertical position, in the embodiment of FIG. 8 it is in the horizontal position. The mixing device comprises a single hot air duct 14 and a single cold air duct 18*e* situated at the front of the vehicle with respect to the heater matrix 16. Apart from this different arrangement of the matrix and of the hot and cold air ducts, the way in which the shutter 50 that shuts off the cold air duct and the shut-off plate 44 works is identical to the working of the embodiment described with reference to FIGS. 1 to 4.

Figure 9:
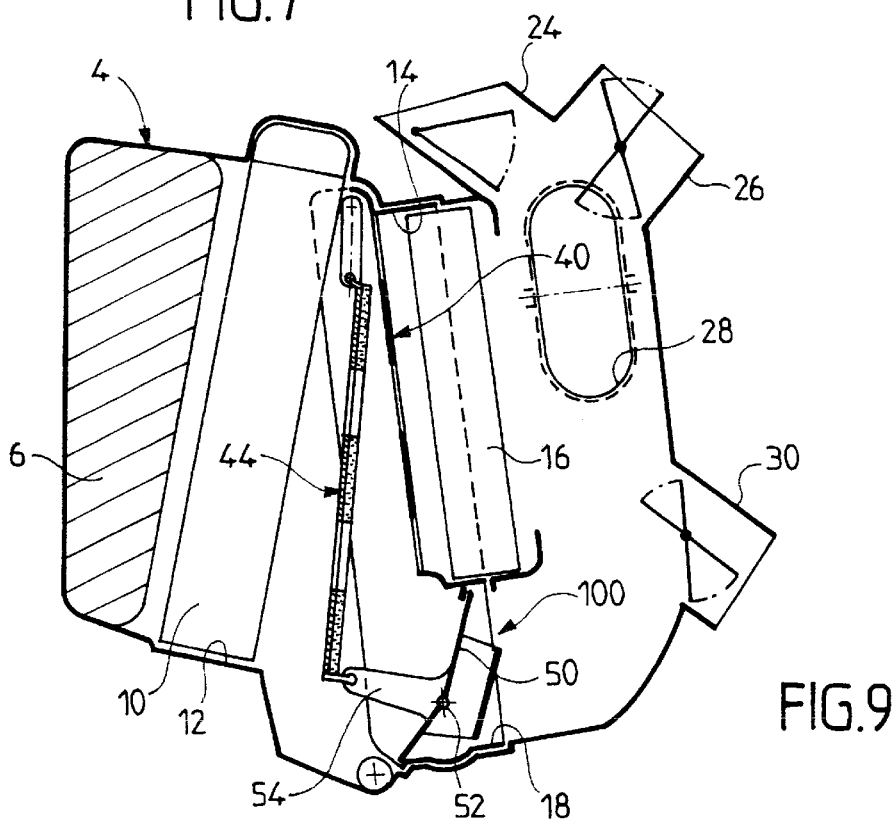
FIG. 9 depicts a heating and air-conditioning apparatus comprising a mixing device according to the invention constituting an independent module attached into the casing of the heating apparatus.

The mixing device denoted by the general reference 20 (FIG. 1) can be incorporated into the casing of the heating and air-conditioning apparatus 4. It may also be in the form of an independent module 100 (FIG. 9). The module 100 comprises the hot 14 and cold 18 air ducts, the heater matrix 16 installed in the hot air duct 14, the panel 40, the shut-off plate 44 and the shutter 50, and their actuating mechanism. These various parts are assembled separately to form a single entity which is mounted as one piece in the casing 4. To this end, the casing may consist of two half-shells which can be opened up to allow the air mixing module 100 to be introduced. Alternatively, the casing 4 may have a side opening to allow the module 100 to be mounted like a rack module.

In the alternative forms of embodiment, described with reference to FIGS. 1 to 9, the movement of the shut-off plate 44 is controlled directly by the arms 54 secured to the rotary shutter 50. This control mechanism is the simplest. However, according to the invention, the control mechanism may also be more complicated. It may, for example, as depicted in FIG. 10, comprise an independent control lever 102 mounted to rotate about a spindle 104 distinct from the spindle 52 of the rotary shutter 50. At one of its ends, the lever 102 is articulated to the lower end (according to FIG. 10) of the shut-off plate 44. At its upper end, it is articulated to an arm 106 secured to the rotary shutter 50. The arm 106 has a slot 108 in which there moves a peg 110 mounted at the end of the lever 102. The pivoting of the control lever 102 is performed via its rotation spindle 104. The lever 102 thus simultaneously controls the rotation of the shutter 50 and the combined rotational and translational movement of the shut-off plate 44. The fact of using an independent control lever offers greater flexibility in the layout of the elements, the situation of the rotation spindle of the control level, or the position of the rotation spindle of the arm.

FIG. 11 depicts an alternative form of embodiment of the control mechanism. In this alternative form, the control lever 102 comprises a toothed sector 112 and the rotary shutter 50 comprises a toothed sector 114 which meshes with the toothed sector 112. The rotational movement of the lever 102 is transmitted to the shutter 50 via the toothed sectors 112 and 114. The control of the movement of the shut-off plate 44 is identical to that of the embodiment depicted in FIG. 10.

In FIG. 12, the control lever 102 can move about a rotation spindle 104 located on the opposite side of the shut-off plate 44 to the evaporator 16. The kinetics of movement of the shut-off plate 44 are therefore different. The end of the shut-off plate in this instance covers an arc of a circle 112, the convex side of which is on the opposite side to that of the embodiments described previously. The arm 54 of the rotary shutter 50 is articulated to the lower end (according to the figure) of the shut-off plate 44.

In FIG. 13, the lever 102 is articulated, on the one hand, to the lower end of the shut-off plate 44 and, on the other hand, to the end of the lever 54 secured to the rotary shutter 50. For this purpose, the arm 54 has a slot 108 in which there slides a peg 110 mounted at the end of the control lever 102. As in the alternative form of FIG. 12, the rotation spindle 104 of the lever 102 is situated on the opposite side of the shut-off plate 44 to the heater matrix 16. The convex side of the arc of a circle 112 is therefore the same.

In the alternative forms of embodiment of FIGS. 10 to 13, the movement of the shut-off plate 44 and of the rotary shutter 50 is controlled directly by the control lever 102. By contrast, in the alternative forms of FIGS. 14 and 15, the movement of the rotary shutter 50 is controlled indirectly via a link rod 114 which connects the control lever 102 to the arm 54 of the rotary shutter 50. In FIG. 14, the lever 102 pivots about a rotation spindle 104 situated in the cold duct 18, near the rotary shutter 50. In consequence, the link rod 114 may have a straight shape. By contrast, in the alternative form of FIG. 15, the control lever 102 is situated between the evaporator 10 and the shut-off plate 44, some distance from the rotary shutter 50. In consequence, the link rod 116 has a cranked shape so as to run around the lower end (according to the figure) of the shut-off plate 44. By contrast, in the alternative forms of FIGS. 14 and 15, the control lever 102 is articulated directly to the lower end of the shut-off plate 44, with no intermediate link rod.

The mixing device of the invention may comprise means which allow the constancy of the control force needed to move the rotary shutter 50 and the shut-off plate 44 to be maintained. Various examples of these means are illustrated in FIGS. 16 to 18. In FIG. 16, a helical spring 120 is mounted, at one of its ends, on a wall of the casing 4 and, at its other end, on a boss 124 secured to the rotary shutter 50. The helical spring 120 is a tension spring which exerts a tensile force, as depicted schematically by the arrow 125, on the end of the rotary shutter 50 and this has the effect of counterbalancing the weight of the shut-off plate 44. The control force is thus lightened by virtue of the helical spring 120. In the same FIG. 16 is depicted one possible alternative form of embodiment of the helical spring 16. A flexible leaf 126 has one end 128 mounted in a housing secured to the arm 54 and another end engaged in a housing 130 secured to the lower end of the shut-off plate 44. The elastic leaf 126, tending to maintain its straight shape, exerts a force, depicted schematically by the arrow 132, the action of which is equivalent to that of the helical spring 120.

In the alternative form of FIG. 17, the helical spring 120 has been replaced by a counterweight 134 exerting an action 136 which balances the weight of the shut-off plate 44. Finally, in FIG. 18, there are two scoops 140 on the face of the shut-off plate 44 exposed to the air stream 1 (FIG. 1). The air, rushing into these scoops, produces reaction forces, depicted schematically by the arrows 142, on the shut-off plate 44. The forces 142 tend to lift the plate, thus reducing the force needed to move it.

Figure 19:
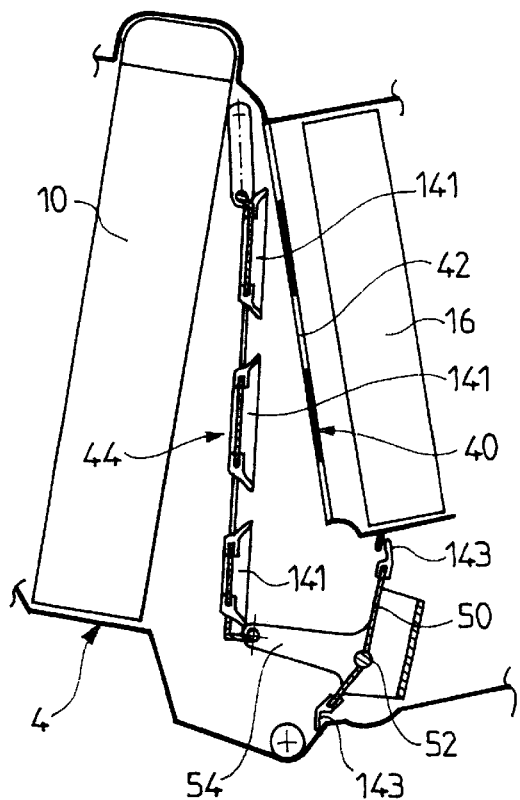
FIGS. 19 to 21 illustrate three alternative forms of embodiment of means of sealing the panel and the shut-off plate against air.
Figure 20:
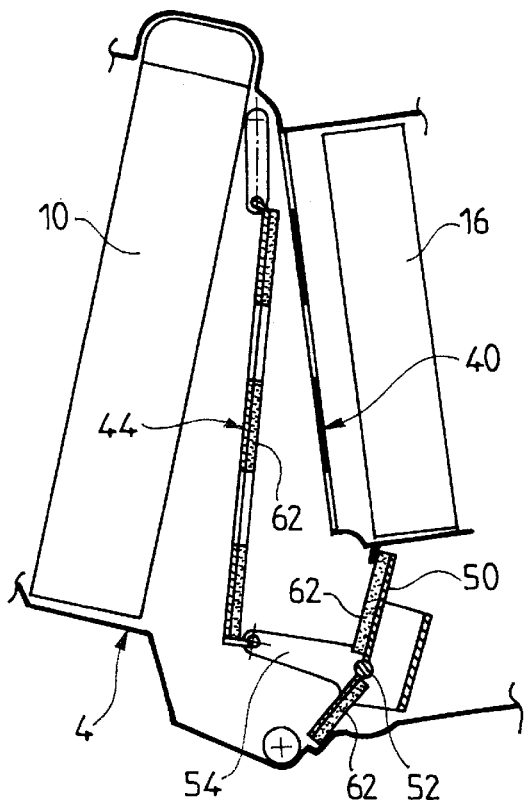
Figure 21:
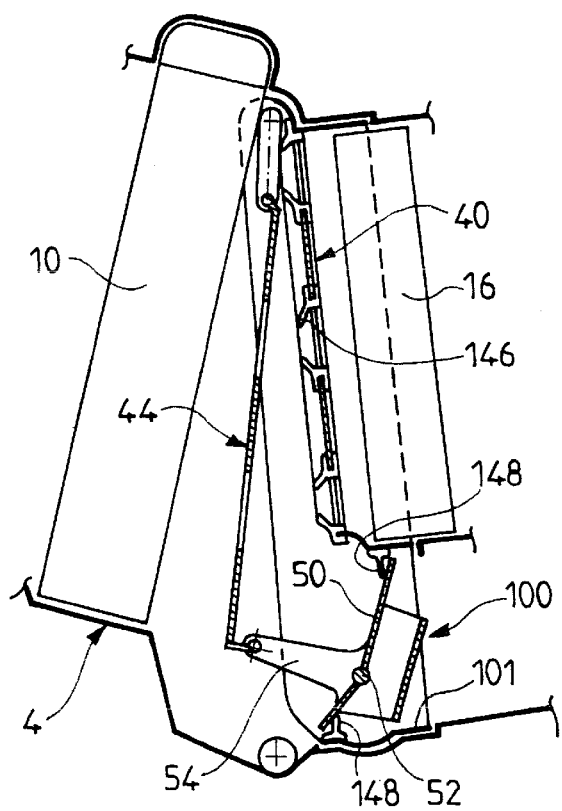

FIGS. 19 to 21 depict various possible alternative forms of embodiment of the means of sealing between the shut-off plate 44 and the panel 40. In FIG. 19, flexible lips 141 are overmolded onto the shut-off plate 44. In the shut-off position, the lips 140 press against the perforations 42 in the panel 40, thus providing sealing. In FIG. 20, the shut-off plate 44 is covered with a foam seal 62, already mentioned with reference to FIG. 2. As an alternative, the shut-off plate 44 could be covered with foam. Conversely, the foam seal could be provided on the panel 40 instead of being provided on the shut-off plate. Similarly, a foam seal 62 may be provided on the faces of the rotary shutter 50.

Similarly (FIG. 19), sealing lips 143 are provided at the ends of the rotary shutter 50.

In FIG. 21, the mixing device constitutes an independent module 100 (see FIG. 9). Flexible sealing lips 146 are overmolded onto the panel 40, and other lips 148 are attached to the casing 101 of the mixing module 100. Of course, it is possible to combine the various sealing means described with reference to FIGS. 19 to 21, or to use still other types of seal. In general, any type of seal and any type of material may be used.

Figure 22:
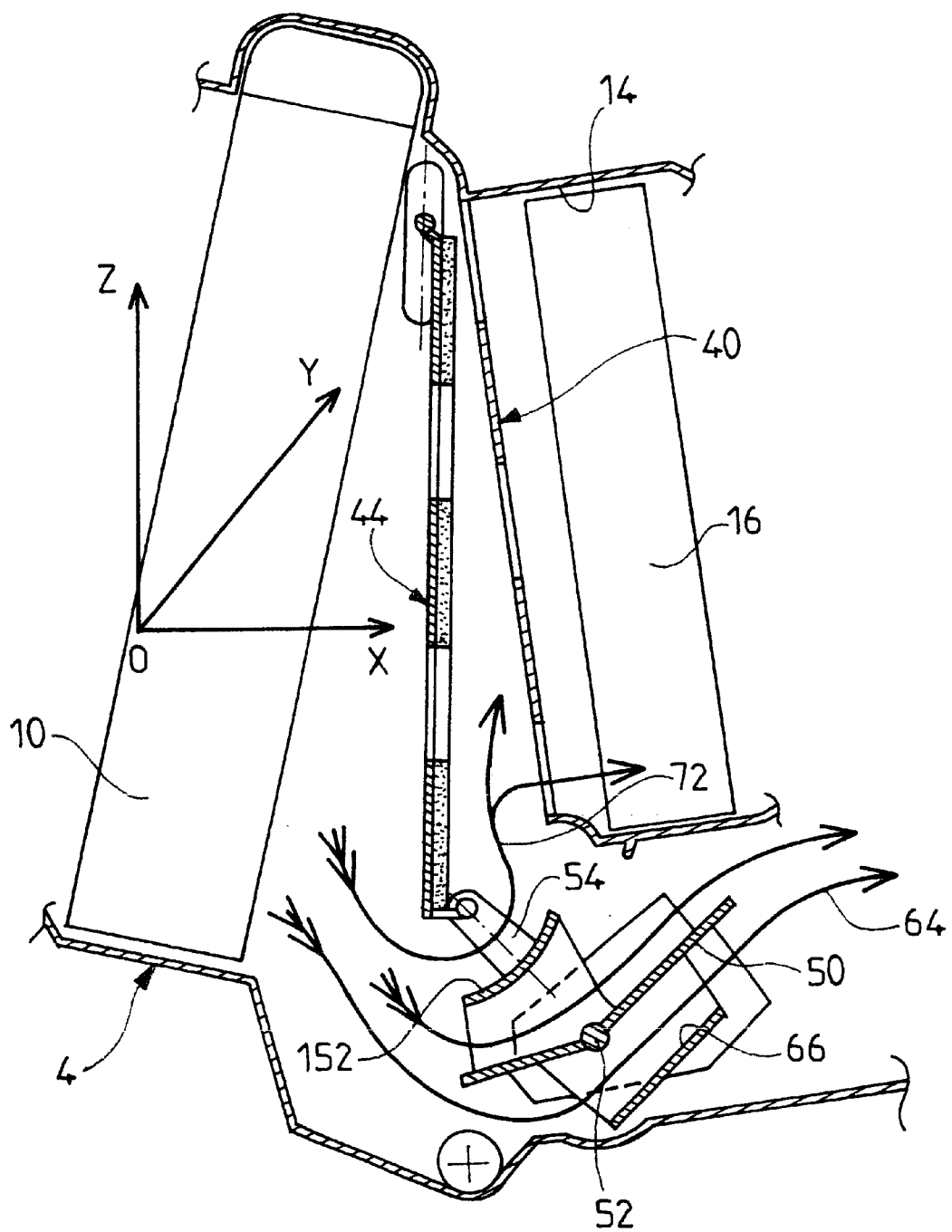
FIG. 22 depicts an example of the layout of deflecting means on the shutter for adjusting the passage cross section of the cold air duct making it possible to aerothermally optimize the heating and/or air-conditioning apparatus.

As depicted in FIG. 22, air deflecting means, local deformations, masks and air guidance ducts may be installed on the elements of the mixing device or on the casing to play a part in the aerothermal optimization of the apparatus. In the alternative form depicted in FIG. 22, the rotary shutter 50 comprises an air deflecting bridging piece 56 on its underside to concentrate the cold air stream 64 into a targeted region of the apparatus. The shutter 50 also comprises ribs 150 perpendicular to its plane. These ribs may be straight or inclined to allow the air to be deflected or ducted along the Y-axis (transverse direction of the vehicle). Finally, on its top face, the rotary shutter 50 has a deflecting flap 152 for directing the air stream 72 toward the hot air duct 14. The hot air deflecting bridging piece 152 thus plays a part in distributing the air stream over the entire area of the matrix 16, thus guaranteeing optimal thermal matching. Finally, as depicted in FIGS. 23 to 26, the mixing device of the invention may comprise means for reducing the noise level. The shut-off plate 44 and the shapes of the inlet section to the hot air duct 14 may be defined in such a way as to limit the level of noise resulting from the circulation of the air through the casing 4. In FIG. 23, the shapes of the shut-off plate 44 and those of the panel 40 are aerodynamic so as to reduce the resistance to the air. For this purpose, elements 156 overmolded onto the shut-off plate 44 and elements 158 overmolded onto the panel 40 have been provided. This arrangement limits the aerodynamic disturbances of the air vortex type which generate noise.

The corners of the perforations 42 in the panel 40 and of the openings 46 in the shut-off plate 44 may be rounded. This arrangement eliminates the whistling noise generated as an air stream passes over a sharp edge. The overmoldings 156 and 158 may constitute hollow bodies which will have a noise-absorbing role. To achieve these arrangements, use may be made of the core of the elements and/or the sealing system, or both combined.

In the alternative form of FIG. 24, inserts 160 made of lightened material, for example made of plastic material with gas injection, or any other material whose characteristics play a part in reducing the level of noise resulting from the circulation of air have been provided.

In the alternative form of embodiment of FIG. 25, air-permeable screens 162 have been installed in the openings 46 in the shut-off plate 44. These screens may be gratings or a similar means, the function of which will be to make the air stream uniform and thus limit the level of noise resulting from its circulation. Similar permeable screens 162 may be formed in the perforations 42 in the panel 40. The screens 162 may be incorporated directly into the shut-off plate 44 and the panel 40 or produced separately and then attached.

In the alternative form of embodiment depicted in FIG. 26, inserts 162 covered with an absorbent material are arranged on the face of the shut-off plate 44 exposed to the air stream. Similar inserts may be provided on the face of the panel 40 exposed to the air stream. The absorbent material may be a polyurethane foam. The inserts 164 have the function of absorbing the noise generated by the circulation of the air.

The invention applies to apparatuses for heating and/or air-conditioning the cabin of motor vehicles, which apparatuses are able to send a hot and/or air-conditioned air stream either into a single region or into several regions of the cabin.

What is claimed is:

1. A mixing device, for distributing in variable proportions a main air stream, particularly a stream of air flowing through an apparatus for heating and/or air-conditioning the cabin of a motor vehicle, between at least one hot air duct and at least one cold air duct, which device comprises at least one panel comprising at least one perforation arranged in the hot air duct and a shut-off plate that can move between an open position in which it does not cover the perforation in the panel and a shut-off position in which it shuts off the panel, at least one shutter for adjusting the passage cross section of the cold air duct that can move between an open position and a shut-off position, a control mechanism for controlling, in synchronism, the movement of the shut-off plate and the movement of the shutter for adjusting the passage cross section of the cold air duct between their open position and their shut-off position.

2. The device as claimed in claim 1, wherein the panel comprises a number of perforations and the shut-off plate has a number of cutouts, the perforations in the panel and the cutouts in the shut-off plate being arranged with respect to one another in such a way that the hot air duct is shut off when the shut-off plate is in its shut-off position.

3. The device as claimed in claim 1, wherein the shut-off plate moves in a combined movement of translation and of rotation, the shut-off plate being spaced away from the panel in the open position.

4. The device as claimed in claim 1, and which comprises at least one guide ramp and wherein the shut-off plate comprises at least one peg which slides in the guide ramp.

5. The device as claimed in claim 1, wherein the heater matrix is roughly vertical.

6. The device as claimed in claim 5, and which comprises a single cold air duct situated below the hot air duct.

7. The device as claimed in claim 5, and which comprises a single cold air duct situated above the hot air duct.

8. The device as claimed in claim 5, and which comprises a cold air duct situated below the hot air duct and a cold air duct situated above the hot air duct.

9. The device as claimed in claim 5, and which comprises a single cold air duct situated to the side of the hot air duct.

10. The device as claimed in claim 5, and which comprises two cold air ducts situated one to each side of the hot air duct.

11. The device as claimed in claim 1, wherein the heater matrix is roughly horizontal.

12. The device as claimed in claim 11, and which comprises a single cold air duct situated below the hot air duct.

13. The device as claimed in claim 11, and which comprises a single cold air duct situated above the hot air duct.

14. The device as claimed in claim 11, and which comprises a cold air duct situated below the hot air duct and a cold air duct situated above the hot air duct.

15. The device as claimed in claim 11, and which comprises a single cold air duct situated to the side of the hot air duct.

16. The device as claimed in claim 11, and which comprises two cold air ducts situated one to each side of the hot air duct.

17. The device as claimed in claim 1, wherein the control mechanism comprises a control lever which controls the movement of the shut-off plate and the movement of the shutter for adjusting the passage cross section of the cold duct.

18. The device as claimed in claim 17, wherein the control lever controls the movement of the shut-off plate and/or the movement of the shutter for adjusting the passage cross section of the cold duct via a link rod.

19. The device as claimed in claim 17, wherein the control lever controls the movement of the shutter for adjusting the passage cross section of the cold air duct via toothed sectors.

20. The device as claimed in claim 1, wherein the shut-off plate and/or the shutter for adjusting the passage cross section of the cold duct are equipped with a balancing device.

21. The device as claimed in claim 20, wherein the balancing device comprises springs or a bob weight or scoops.

22. The device as claimed in claim 1, wherein the shut-off plate and/or the shutter for adjusting the passage cross section of the cold air duct comprise air deflecting means such as bridging pieces or ribs to direct the hot air stream and/or the cold air stream toward chosen regions of a device for heating and/or air-conditioning the cabin of a motor vehicle.

23. The device as claimed in claim 1, wherein the shut-off plate and/or the panel comprise sealing means for sealing the hot air duct when the shut-off plate is in the shut-off position.

24. The device as claimed in claim 23, wherein the sealing means comprise flexible lips overmolded onto the panel and/or onto the shut-off plate.

25. The device as claimed in claim 23, wherein the sealing means comprise a foam seal provided on the panel and/or on the shut-off plate and/or on the shutter.

26. The device as claimed in claim 1, wherein the shut-off plate and/or the panel comprise means for attenuating the level of noise generated by their operation.

27. The device as claimed in claim 26, wherein the means for attenuating the noise level comprise elements for profiling the panel and/or the shut-off plate.

28. The device as claimed in claim 26, wherein the means for attenuating the noise level comprise inserts made of lightened material.

29. The device as claimed in claim 26, wherein the means for attenuating the noise level comprise inserts covered with an insulating material.

30. The device as claimed in claim 26, wherein the means for attenuating the noise level comprise a grating provided in the cutouts of the shut-off plate or in the perforations of the panel.

31. An apparatus for heating and/or air-conditioning particularly the cabin of a motor vehicle, comprising a casing delimiting a passage through which an air stream flows, this passage splitting at least one hot air duct and at least one cold air duct, and which apparatus comprises a mixing device as claimed in claim 1.

32. The apparatus as claimed in claim 31, wherein the mixing device is installed directly in the casing.

33. The apparatus as claimed in claim 31, wherein the device for mixing the air stream constitutes an independent module attached into the casing.

* * * * *